US008181249B2

(12) United States Patent
Chow et al.

(10) Patent No.: US 8,181,249 B2
(45) Date of Patent: May 15, 2012

(54) MALWARE DETECTION SYSTEM AND METHOD

(75) Inventors: Stanley Chow, Ottawa (CA); Bassem Abdel-Aziz, Kanata (CA); Faud Khan, Osgoode (CA)

(73) Assignee: Alcatel Lucent, Paris (FR)

( * ) Notice: Subject to any disclaimer, the term of this patent is extended or adjusted under 35 U.S.C. 154(b) by 1112 days.

(21) Appl. No.: 12/039,817

(22) Filed: Feb. 29, 2008

(65) Prior Publication Data

US 2009/0222920 A1   Sep. 3, 2009

(51) Int. Cl.
G06F 12/14   (2006.01)
(52) U.S. Cl. ............................. 726/23; 726/24; 713/187
(58) Field of Classification Search .............. 726/22–25; 713/187, 188
See application file for complete search history.

(56) References Cited

U.S. PATENT DOCUMENTS

| 7,089,589 | B2 * | 8/2006 | Chefalas et al. ................ 726/22 |
| 7,467,405 | B2 * | 12/2008 | Cheng ............................. 726/10 |
| 7,516,487 | B1 * | 4/2009 | Szeto et al. ..................... 726/22 |
| 7,870,608 | B2 * | 1/2011 | Shraim et al. ................... 726/22 |
| 2005/0195753 | A1 | 9/2005 | Chaskar et al. |
| 2006/0291469 | A1 | 12/2006 | Omote et al. |
| 2007/0011741 | A1 | 1/2007 | Robert et al. |
| 2007/0067845 | A1 | 3/2007 | Wiemer et al. |
| 2007/0067847 | A1 | 3/2007 | Wiemer et al. |
| 2007/0067848 | A1 | 3/2007 | Gustave et al. |
| 2007/0101430 | A1 * | 5/2007 | Raikar ............................. 726/24 |
| 2007/0208822 | A1 * | 9/2007 | Wang et al. ..................... 709/217 |
| 2009/0241191 | A1 * | 9/2009 | Keromytis et al. ............. 726/23 |

FOREIGN PATENT DOCUMENTS

WO   WO 2007/143011 A2   12/2007

OTHER PUBLICATIONS

International Search Report and Written Opinion, Apr. 2007, Alcatel Lucent.
Written Opinion, Apr. 2005, Alcatel Lucent.
Yi-Min Wang, Doug Beck, Xuxian Jiang, and Roussi Roussev, Automated Web Patrol with Strider HoneyMonkeys, Jul. 2005, Mircosoft.
Ruoming Pang, Mark Allman, Mike Bennett, Jason Lee, Vern Paxson, and Brian Tierney, "A First Look at Modern Enterprise Traffic", Princeton University, International Computer Science Institute, Lawrence Berkeley National Laboratory, Internet Measurement Conference 2005.
Jaeyeon Jung, Vern Paxson, Arthur W. Berger, and Hari Balakrishnan, "Fast Portscan Detection Using Sequential Hypothesis Testing", MIT Computer Science and Artificial Intelligence Laboratory, Cambridge, MA, USA, ICSI Center for Internet Research and Lawrence Berkeley National Laboratory, Berkeley, CA, USA.

(Continued)

*Primary Examiner* — Kambiz Zand
*Assistant Examiner* — Amare F Tabor
(74) *Attorney, Agent, or Firm* — Fay Sharpe LLP

(57) ABSTRACT

Methods and systems are presented for detection of malware such as worms in which a network switch entices the malware into sending scan packets by allocating one or more ports as bait addresses, sending outgoing bait packets, and identifying compromised hosts that send unexpected incoming packets to a bait address.

20 Claims, 4 Drawing Sheets

OTHER PUBLICATIONS

David Whyte, Evangelos Kranakis, and P.C. Van Oorschot, "DNS-based Detection of Scanning Worms in an Enterprise Network", School of Computer Science, Carlton University, Ottawa, Ontario, Canada, Proceedings of the 12th Annual Network and Distributed System Security Symposium, San Diego, USA. Feb. 3-4, 2005.

Stuart E. Schechter, Jaeyeon Jung, and Arthur W. Berger, "Fast Detection of Scanning Worm Infections", Harvard DEAS, Cambridge, MA, USA, MIT CSAIL, Cambridge, MA, USA.

Shobha Venkataraman, Dawn Song, Phillip B. Gibbons, and Avrim Blum, "New Streaming Algorithms for Fast Detection of Superspreaders", Carnegie Mellon University, Intel Research Pittsburgh.

David Whyte, P.C. Van Oorschot, and Evangelos Kranakis, "ARP-based Detection of Scanning Worms Within an Enterprise Network", School of Computer Science, Carleton University, Ottawa, Canada, Jan. 31, 2005.

Paul C. Van Oorschot, Jean-Marc Robert, and Miguel Vargas Martin, "A Monitoring System for Detecting Repeated Packets with Applications to Computer Worms", Mar. 8, 2006.

Nicholas Weaver, Stuart Staniford, and Vern Paxson, "Very Fast Containment of Scanning Worms".

\* cited by examiner

MALWARE DETECTION SYSTEM AND METHOD

FIELD OF THE INVENTION

This invention relates generally to the field of networked communications, and more particularly to methods and systems for detecting malware.

BACKGROUND OF THE INVENTION

Computer networks are often plagued by malware such as worms that use the resources of network processing devices without the knowledge and permission of the owner. Worms are computer programs that self-replicate by sending network packets to unguarded elements of the network. This type of malware is often used for identity theft and financial fraud, and thus poses a threat to users of the Internet and to businesses that have an online presence. Different approaches have been proposed and implemented for identifying and preventing further spread of such malware. These include signature-based methods, traffic anomaly methods, and so-called honey-spot techniques. The signature-based techniques are largely ineffective since it is very easy for worms to change signatures to avoid detection and remedial action, and these methods are ineffective against zero-day attacks. So-called stealth worms minimize the number of packets sent (e.g., only a few packets per week) in attempting to identify targets. These worms send scan packets at a very slow rate to hosts that show network activity, and sophisticated stealth worms often employ reconnaissance scans targeting hosts and servers with specific weaknesses that the worm can exploit. This type of malware is difficult to reliably identify using traffic anomaly methods because the rate of scanning packets is very low compared to normal traffic in a network. Consequently, the signal-to-noise ratio is very low in the case of stealth worms, as the signal rate of the worm's scanning packets is small compared to the noise level of the normal network traffic. Moreover, advanced stealth worms adjust the transmission rate of scanning packets based on actual network traffic, thereby reducing the chances of detection by traffic anomaly analysis. As a result, a stealth worm that maintains a SNR of less than 0.01% is virtually impossible to detect by traffic anomaly analysis without generating many false positives. The cost of false detections is high, particularly where the network takes automatic actions upon detecting possible infections. As a result, stealth worm detection has thusfar been difficult using conventional signature or traffic anomaly analysis methods. Accordingly, there remains a need for improved detection methods and systems to identify compromised hosts on a network for remedial steps to be taken to reduce the damaging effects of worms and other malware.

SUMMARY OF THE INVENTION

The following is a summary of one or more aspects of the invention to facilitate a basic understanding thereof, wherein this summary is not an extensive overview of the invention, and is intended neither to identify certain elements of the invention, nor to delineate the scope of the invention. Rather, the primary purpose of the summary is to present some concepts of the invention in a simplified form prior to the more detailed description that is presented hereinafter. The various aspects of the present disclosure relate to systems and methods for detecting worms and other malware in which a network switch entices the malware into sending scan packets by allocating a bait address, sending outgoing bait packets, and identifying compromised hosts that send unexpected incoming packets to the bait address. This technique allows reliable identification of stealth worms that send scan packets at a low rate, and therefore provides significant improvement over conventional traffic anomaly analysis techniques for stealth worm detection while minimizing the likelihood of false positives. In addition, the described systems and methods do not rely upon signature analysis, and are thus able to detect malware that adjust their signal signatures, and to identify infected hosts even for zero-day attacks.

One or more aspects of the present disclosure relate to a system for detecting malware infected computing devices in a network. The system is comprised of a network element, such as a layer 2 or layer 3 switch (router) or other network node in certain embodiments, which has one or more network addresses allocated as a bait address. In certain implementations, the bait address is a layer 2 address, such as a media access control (MAC) address that is shared by a first switch port configured for transmitting bait packets (TX) and a second port configured for receiving incoming packets from the network (RX). In other embodiments, all ports of the network element are allocated as bait addresses. The bait address in certain embodiments may also be an IP address. The network element also comprises a malware detection component that sends one or more outgoing bait packets from the bait address to the network and receives incoming packets from the network at the bait address. The detection component selectively identifies the source of the incoming packet as infected with malware if the incoming packet is unexpected or from an unauthorized source. In one embodiment, the detection component includes a policy table with a bait packet types list and a bait packet schedule, where the outgoing bait packet or packets are sent from the bait address to the network according to the bait packet types list and the bait packet schedule. In this manner, the detection component can conduct a "sting" operation according to a script of packet types at scheduled times in order to entice a worm or other malware into targeting the bait address for scanning probe packets. The bait packet or packets, moreover, may be sent as a broadcast from the bait address to the network or as a unicast to certain network addresses. The outgoing bait packets, moreover, preferably do not indicate any specific service, whereby worms cannot adapt their behavior to avoid targeting certain service types. In one example, the detection component sends out one or more bootp broadcast packets as bait to attract malware in the network. Moreover, the malware detection component may determine whether incoming packets are unexpected at least partially based on the type of outgoing bait packet sent from the bait address to the network.

Further aspects of the present disclosure provide a method of detecting malware infected computing devices in a network. The method includes allocating at least one network address in a network element as a bait address and sending at least one outgoing bait packet from the bait address to the network. In specific embodiments, all ports of the network element may be allocated as bait addresses. The method further includes receiving an incoming packet from the network at the bait address and selectively identifying a source of the incoming packet as infected with malware if the incoming packet is unexpected or from an unauthorized source. In accordance with further aspects of the disclosure, the network element may be a layer 2 switch or a layer 3 switch coupled to the communications network, and the bait address can be a layer 2 address, such as a MAC address shared by a first transmit port and a second receive port of the network element or an IP address. The outgoing bait packets may be sent according to a policy table stored in the network element according to other aspects, and may be sent according to a bait packet types list and a bait packet schedule stored in the network element in certain implementations. In addition, the outgoing bait packets may be sent as broadcast or unicast packets from the bait address.

BRIEF DESCRIPTION OF THE DRAWINGS

The following description and drawings set forth in detail certain illustrative implementations of the invention, which are indicative of several exemplary ways in which the principles of the invention may be carried out. Various objects, advantages, and novel features of the invention will become apparent from the following detailed description of the invention when considered in conjunction with the drawings, in which.

DETAILED DESCRIPTION

Figure 1:
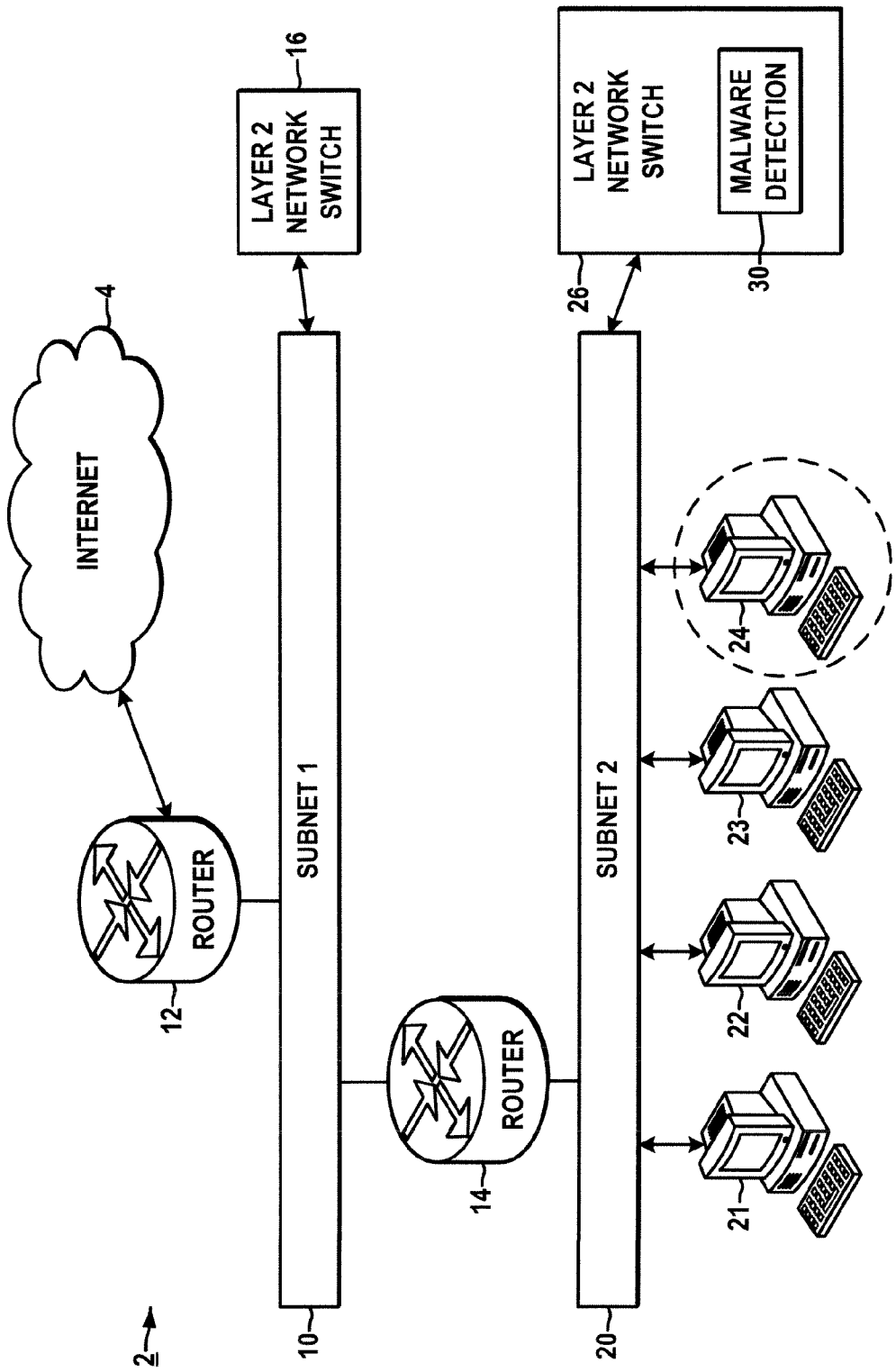
FIG. 1 is a schematic system level diagram illustrating an exemplary communications network having a number of computing devices operatively interconnected to one another, including a switch network element configured with a malware detection component in accordance with one or more aspects of the present disclosure.

Several embodiments or implementations of the various aspects of the present disclosure are hereinafter illustrated and described in conjunction with the drawings, wherein like reference numerals are used to refer to like elements.

Referring initially to FIG. 1, an exemplary system is illustrated for detecting malware infected computing devices 24 in a network 2. The network 2 includes any number of operatively interconnected computing devices communicatively coupled with one another via one or more wired and/or wireless connections for exchanging various signals, messages, packets, etc. with one another, wherein only a certain number of devices and interconnections are shown in the figure so as not to obscure the various aspects of the present disclosure. The illustrated network 2 includes a first subnet 10 that is operatively connected to the Internet 4 via a first router (e.g., layer 3 switch) 12, and a second subnet 20 connected to the first subnet 10 via a second router 14. A first network switch 16 (layer 2 switch) is connected to the first subnet 10 and a network switch 26 is connected to the second subnet 20 along with several computing devices 21-24, where computer 24 is assumed to be compromised or infected with a worm malware in the following discussion, and wherein each of the switches 12, 14, 16, 26, computers, servers 21-24, etc. are considered as being a network element. The disclosure may be implemented in any form, type, and topology of network, whether wired, wireless, or combinations thereof, in which various messages, packets, signals, data, etc., are sent and received according to any suitable messaging protocols, wherein the network may be operated according to any suitable multilayer scheme (e.g., the OSI basic reference model or derivatives or variants thereof) in which messages to, from, or between the various networked components may be segmented or partitioned into packets, and in which one or more layers may add certain control information around a payload portion from another layer to form encapsulated packets or messages. In this regard, packets as used herein is intended to encompass all forms of frames, data packets, etc. sent over the network 2 within a given layer or multiple layers.

Figure 2:
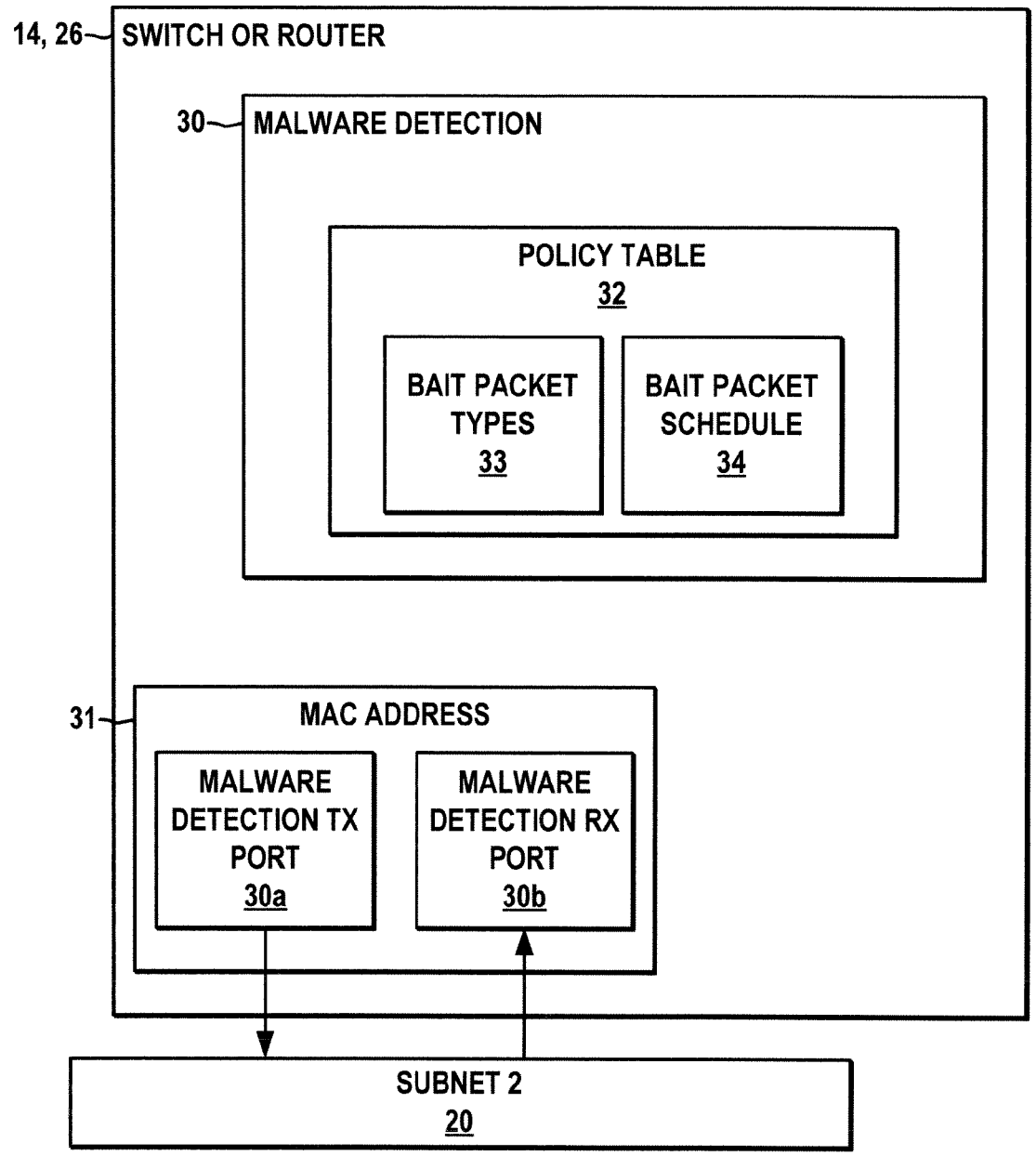
FIG. 2 is a schematic diagram illustrating further details of the exemplary malware detection component in accordance with the disclosure.

Referring also to FIG. 2, in the illustrated system, one or more network elements are configured to include malware detection components 30. In this example, for instance, the layer 2 network switch 26 is outfitted with one or more processors running one or more malware detection components 30 as software. In other exemplary embodiments, a layer 3 switch (router) 12 or 14 could be likewise configured with malware detection components as described herein, and the exemplary malware detection components 30 could be provided in one or more other servers or computers 21-24 or other elements operatively connected to the network 2. The switch 26 in FIGS. 1 and 2 has multiple configurable ports operatively coupled to the subnet 20, any or all of which may be associated with a network address, or multiple ports may share an address. In the illustrated example, the switch 26 has at least one network address allocated as a bait address for use by the malware detection component 30, in this case a layer 2 media access control (MAC) address 31 (FIG. 2). The MAC address 31, moreover, is shared by a first port 30a of the network element 26 configured for transmitting bait packets to the network 2 and a second port 30b of the network element 26 configured for receiving incoming packets from the network 2. In another possible embodiment, the bait address is an IP address. The bait IP addresses can be RFC1918 addresses, e.g., unroutable addresses for use behind any network address translation (NAT), wherein the malware detection component 30 can be implemented on any subnet whether the subnet address is global or RFC1918. In addition, when an IP address is allocated as a bait address, a MAC address may be also assigned (e.g., a fake MAC address) as well. The network address or addresses allocated for bait packet transmission and/or reception may be addresses with respect to any network layer in accordance with the present disclosure, and may be any address that will be scrutinized and used by a worm or other malware for sending probe packets by which the detection component 30 can entice and detect malware attempts at replication in the network 2. In addition, the bait packet sent by the component 30 and those received at the allocated bait address can be any packet transferred within the network with respect to any network layer or layers, wherein all such packets are contemplated within the scope of the present disclosure.

As best shown in FIG. 2, the exemplary malware detection component 30 includes a policy table 32 with a bait packet types list 33 and a bait packet schedule 34 for scripted transmission of bait packets to the network as described further below. In general, the malware detection component 30 operates to send at least one outgoing bait packet 202 from the bait address to the network 2, to receive an incoming packet 220 from the network at the bait address, and to selectively identify the source of the incoming packet (e.g., host computer 24 in the example of FIG. 1) as being infected with malware if the incoming packet is unexpected or from an unauthorized source. Various components, such as the malware detection component 30 and sub-components thereof, may be implemented in any suitable form of hardware, software, firmware, programmable or configurable logic, or combinations thereof, whether unitary or distributed among two or more entities, wherein all such implementations are contemplated as falling within the scope of the present disclosure and the appended claims.

Various aspects of the disclosure are illustrated and described in terms of software, or algorithms, and/or symbolic representations of operations on data bits within a computer memory, by which ordinary skilled artisans convey the substance of their work. As such, algorithms, scripts, computations, and other operations of the described components 30, 32, 33, 34, etc. may be implemented as computer implemented steps via programmed software core or other programming or configuration to provide a desired result, where such steps involve manipulation or transformation of physical quantities such as stored memory states in a computer memory. In particular, certain embodiments may include software components operating according to programmed computer-executable instructions stored in an electronic memory, which operate on data and packets sent to or received from the network 2, which data may be likewise stored in an electronic memory at least for a time, wherein the packets and data described herein may be of any suitable form including without limitation optical, electrical, or magnetic signals capable of being stored, transferred, combined, compared, and otherwise manipulated, and wherein these may be referred to in various terms such as bits, values, elements, symbols, characters, terms, numbers, etc.

In this regard, unless specifically stated otherwise, or as is apparent from the discussion, terms such as "processing" or "computing" or "calculating" or "determining" or "displaying" or the like, refer to the action and processes of a computer system, or similar electronic computing device, that manipulates and transforms data represented as physical, electronic quantities within the computer system's registers and memories into other data similarly represented as physical quantities within the computer system memories or registers or other such information storage, transmission or display devices. In addition, the various software implemented aspects of the present disclosure are typically encoded on some form of program storage medium or implemented over some type of transmission medium. The program storage medium may be magnetic (e.g., a floppy disk or a hard drive) or optical (e.g., a compact disk read only memory, or "CD ROM"), and may be read only or random access. Similarly, the transmission medium may be twisted wire pairs, coaxial cable, optical fiber, or some other suitable transmission medium known to the art. The invention is not limited by these aspects of any given implementation.

Figure 3:
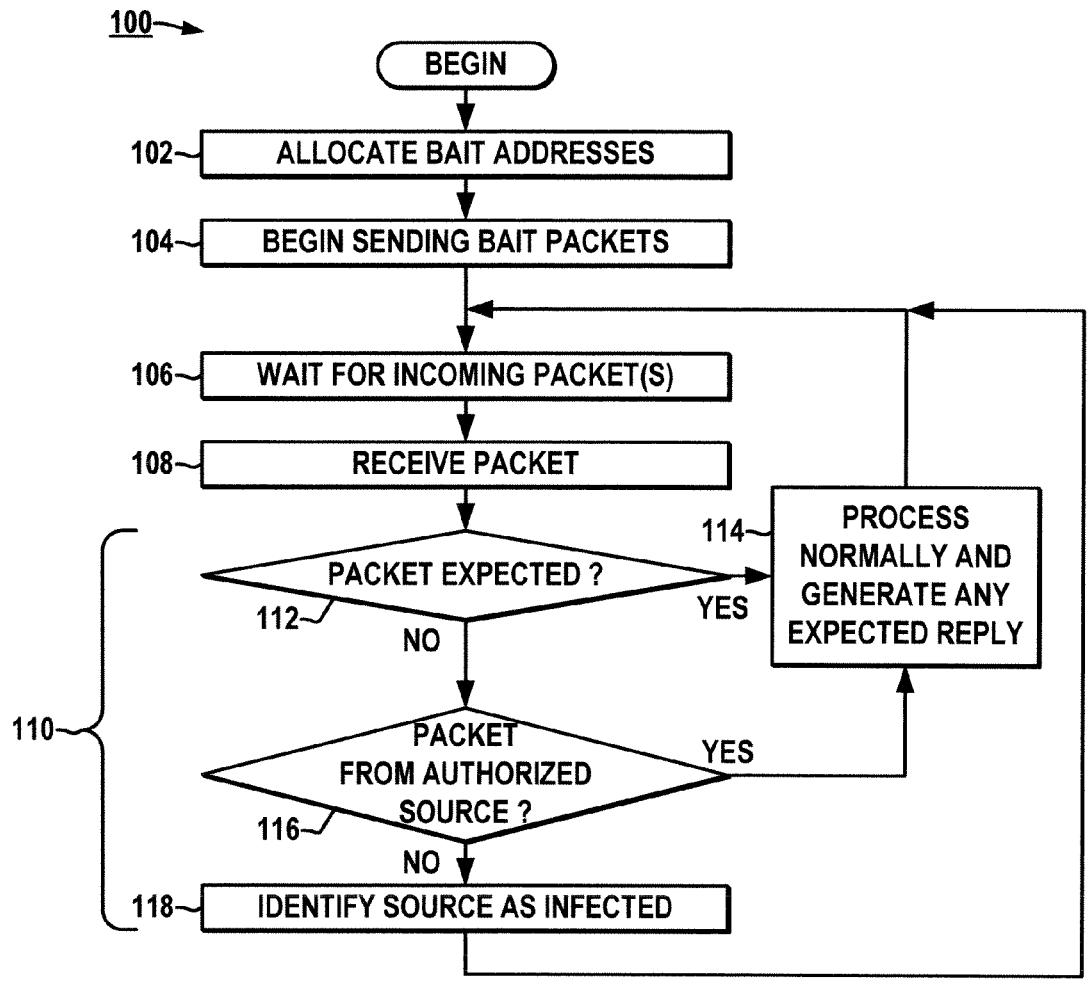
FIG. 3 is a flow diagram illustrating an exemplary method of malware detection in accordance with further aspects of the present disclosure.
Figure 4:
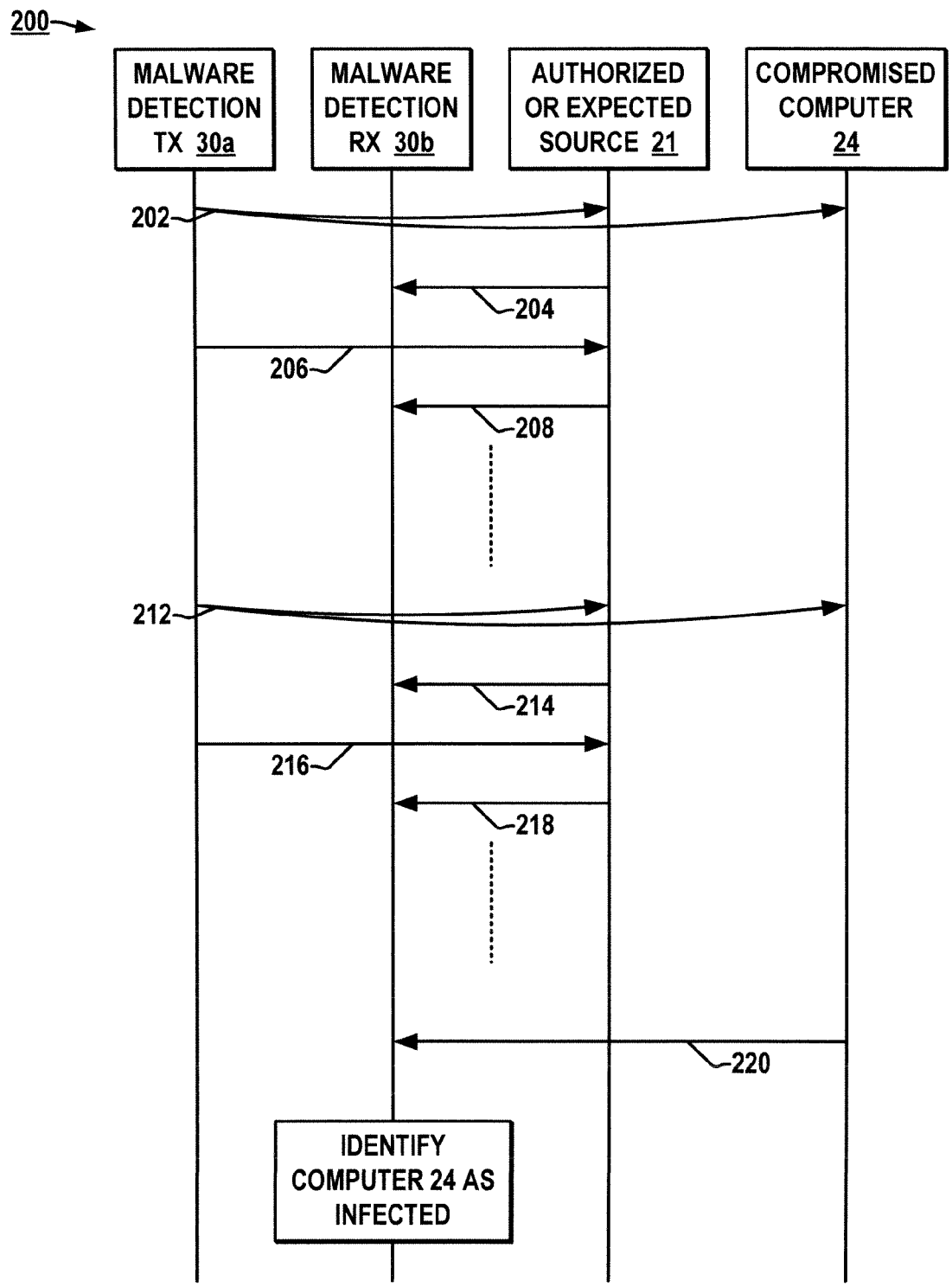
FIG. 4 is a signal flow diagram illustrating transmission of various bait packets from an allocated bait address in the network of FIG. 1 and receipt of various incoming packets by the malware detection component in accordance with the disclosure.

Referring also to FIGS. 3 and 4, the exemplary malware detection component 30 of the network switch 26 is operable generally in accordance with the malware detection method 100 illustrated in the flow diagram of FIG. 3, wherein FIG. 4 illustrates various exemplary network packet transmissions and receipts in the system of FIG. 1 during malware detection operation of the component 30 in accordance with the present disclosure. Although the exemplary method 100 is illustrated and described with respect to FIG. 3 in the form of a series of acts or events, it will be appreciated that the various methods of the disclosure are not limited by the illustrated ordering of such acts or events. In this regard, except as specifically provided hereinafter, some acts or events may occur in different order and/or concurrently with other acts or events apart from those illustrated and described herein in accordance with the disclosure. It is further noted that not all illustrated steps may be required to implement a process or method in accordance with the present disclosure, and one or more such acts may be combined. The illustrated methods and other methods of the disclosure may be implemented in hardware, software, or combinations thereof, in order to provide the malware detection aspects illustrated and described herein.

The method 100 begins at 102 in FIG. 3, with the allocation of one or more network addresses of the network element as bait addresses. In the illustrated example, a layer 2 (data link MAC layer) network address 31 of the network switch 26 is allocated at 102 for use as a bait address. Two ports 30a and 30b of the switch 26 are configured as transmit (TX) and receive (RX) ports sharing the MAC address 31 in the illustrated example, but any configuration of ports and allocation of one or more network addresses as bait addresses is contemplated as falling within the scope of the disclosure. Another advantageous embodiment involves allocating all ports of the network element 26 as bait addresses, where the network element 26 essentially operates somewhat exclusively as a dedicated malware detection engine. In yet another embodiment, the network element may dynamically allocate one or more network addresses for baiting worms and other malware on an availability basis so as to employ currently unused addresses/ports for worm baiting while other ports and addresses of the network element 26 are used for other services, including without limitation the possibility of combined usage of other addresses and ports for signature-based malware detection, network traffic analysis-based malware detection, or as so-called honey-spots for identification of malware.

At 104 in FIG. 3, the malware detection component 30 utilizes the bait address for sending at least one outgoing bait packet. As shown in FIG. 4, in the illustrated example, a broadcast packet 202 is sent from the bait address (TX port 30a) to the network 2, and is received by authorized source 21 and the compromised computer 24. In other implementations, the bait may be sent as a unicast from the bait address to the network 2, or combinations of broadcast and unicast packets may be sent as bait for malware. Outgoing bait packets, moreover, may advantageously be sent from the allocated bait address to the network 2 according to a script such as a policy table 32 in the switch 26 that includes a bait packet types list 33 and a bait packet schedule 34 as shown in FIG. 2.

The bait packet or packets are preferably such that they do not indicate any specific service. In general, the bait can be either broadcast or unicast or combinations thereof. For instance, the bait could be selected so as to appear to a worm like a Windows server just coming online, which begins advertising over NetBEUI. Another example is an IGMP bait packet. The bait could be a unicast transmission, for instance, such as a query for Windows networking to a particular host. The normal response(s) will follow protocol and be ignored by the malware detection component 30 in the network element 26. However, if the host is infected, the worm may harvest the bait address from the bait packet and later send probe packets which will be detected by the component 30. Other suitable bait packet types can include without limitation basic TCP/IP protocols like ARP (Address Resolution Protocol) and DHCP (Dynamic Host Configuration Protocol), such as a bootstrap protocol (bootp) packet 202 in the example of FIG. 4, Windows networking protocols like NetBEUI Name service and Microsoft Windows Browser, Routing notifications like OSPF (Open Shortest Path First, a routing protocol) and RIP (Routing Information Protocol), Group managements like IGMP (Internet Group Management Protocol), and other application-specific or site-specific protocols. Moreover, the component 30 may advantageously determine appropriate timing for the bait packet(s), for example, by manual configuration or by invoking a "script" that specifies frequency or time for different baits via the schedule 34 of the policy table 32 in FIG. 2. In addition, the script may preferably include any expected responses (by packet detail and/or by a timing window) that are associated with the sent bait packet to assist in determination of whether a received packet is indicative of an infected source. The component 30 also determines what method to use in transmitting the bait packets, for example, using either all ports or select ports, or as in FIG. 2, using one port 30a for transmission (TX) and another port 30b for receiving (RX), where the ports used in baiting will share a MAC address 31 in the illustrated implementation. The type and payload of the transmitted bait packets may also be selected based on the protocol stack and the applications in the network 2.

The malware detection component 30 then waits at 106 (FIG. 3) for incoming replies and other incoming packets, in this example, at the configured RX port 30b of the network switch 26 that shares the MAC bait address 31. At 108, an incoming packet is received at the bait address, such as an incoming packet 204 (FIG. 4) from an authorized or expected source 21. At 110, the detection component 30 selectively identifies the source 24 of the incoming packet as infected with malware if the incoming packet is unexpected or from an unauthorized source, and otherwise processes the reply normally at 114 and returns to waiting for other incoming packets at 108. As discussed above, further bait packets can be sent while awaiting incoming packets, such as transmission of select types of bait packets according to a script or schedule in order to portray the bait address as a potential target to malware in the network 2. In this regard, the transmission and receipt can operate asynchronously, for example, using the two ports 30a and 30b sharing the same allocated (MAC) bait address 31 in the illustrated embodiment.

The determination at 110 of whether the received packet is unexpected or from an unauthorized source includes determining at 112 whether the packet is expected or not, for example, based on the type of bait packet(s) previously sent at 104. If the received packet is a normal response to the transmitted bait packet, the reply is processed normally at 114, and the source is not identified as infected. If the received packet is not expected, a determination is made at 116 as to whether the packet is from an authorized source, and if so, it can be processed normally at 114. Otherwise (NO at 116), the source (the sender of the received packet) is identified as infected at 118, and further remedial action can be taken, such as by quarantining the source, etc.

As an illustrative example, FIG. 4 shows one possible scenario in which an outgoing bootp type bait packet 202 is sent as a broadcast from the bait address to the network 2. Normal response packet 204 is received from an authorized source computer 21, such as an unprompted scan from authorized devices 21-23. In this regard, the sent bait packets are preferably selected and constructed such that normal hosts do not need to respond, or so that the normal replies are easily filtered based on received packet type and/or source. For example, ARP requests 202, 206, 212, 216 and replies 204, 208, 214, 218 can preferably be used as bait packets in certain embodiments, as these packets types incur a limited set of expected response packet types to facilitate filtering of expected received responses by the malware detection component 30, while also enticing or attracting malware to probe the bait address. In this example, an infected host 24 will record the source address of the bait packet (e.g., MAC address 31) upon scrutinizing the bait packets sent from the TX port 31a in FIG. 4, and decide to target the bait address 31 for replicating the worm. Accordingly, the compromised source 24 will send a scan packet 220 as shown in FIG. 4. Upon receiving this probe 220, the malware detection component 30 will determine at 112 that the packet 220 is not expected and that it is from an unauthorized source at 116. The host device 24 will accordingly be identified at 118 as infected and proper action, such as disconnecting or quarantining the infected host, can be taken. Optionally, the network manager can also be notified by raising an SNMP trap.

The malware detection component 30 thus operates to set up a "sting" operation in the network 2 to bait malicious worms and the like to attempt self replication at the bait address, without putting otherwise occupied network resources at risk. It is noted that the employment of the malware detection component 30 and the allocation of one or more network addresses and associated switch ports does occupy some resources in the network 2, and indeed adds to the total amount of network traffic. However, this expenditure of system resources and bandwidth (together with any ancillary malware detection components) benefits the network 2 as a whole by facilitating early identification and neutralization of corrupted systems such as the compromised computer 24 in the illustrated example. Once a worm or other malware responds to the bait packets sent by the detection component 30 and is identified as infected, the incoming received packets are logged and action can be taken against the source 24 of the scanning packet(s). Also, the malware detection component 30 can be deployed close to the network edge, such as on enterprise switches 14, 16, 26, and therefore is immune to source address spoofing. Moreover, the bait packet types and timing are preferably selected such that the network traffic generated from and to the bait address does not mimic any specific service and instead merely announces the existence of bait addresses, thereby preventing adaptive worms from avoiding the bait. The detection component 30 is also lightweight and easily deployable on any layer 2 or layer 3 switch or gateway, or on any other type of network node, and may be installed along with other forms of malware prevention components, such as honey spots, signature detection, and/or traffic anomaly analysis type system components.

Although the invention has been illustrated and described with respect to one or more exemplary implementations or embodiments, equivalent alterations and modifications will occur to others skilled in the art upon reading and understanding this specification and the annexed drawings. In particular regard to the various functions performed by the above described components (assemblies, devices, systems, circuits, and the like), the terms (including a reference to a "means") used to describe such components are intended to correspond, unless otherwise indicated, to any component which performs the specified function of the described component (i.e., that is functionally equivalent), even though not structurally equivalent to the disclosed structure which performs the function in the herein illustrated exemplary implementations of the invention. In addition, although a particular feature of the invention may have been disclosed with respect to only one of several implementations, such feature may be combined with one or more other features of the other implementations as may be desired and advantageous for any given or particular application. Also, to the extent that the terms "including", "includes", "having", "has", "with", or variants thereof are used in the detailed description and/or in the claims, such terms are intended to be inclusive in a manner similar to the term "comprising".

The following is claimed:

1. A method of detecting malware infected computing devices in a network, the method comprising:

allocating at least one network address in a network element coupled to a communications network as a bait address;

sending at least one outgoing bait packet from the bait address to the network according to a policy table stored in the network element;

receiving an incoming packet from the network at the bait address;

selectively identifying a source of the incoming packet as infected with malware if the incoming packet is unexpected or from an unauthorized source;

wherein the bait address is a layer 2 MAC address shared by a first port of the network element configured for transmitting bait packets and a second port of the network element configured for receiving incoming packets from the network.

2. The method of claim 1, wherein the network element is a layer 2 switch or a layer 3 switch coupled to the communications network.

3. The method of claim 1, wherein outgoing bait packets are sent from the bait address to the network according to a bait packet types list and a bait packet schedule stored in the network element.

4. The method of claim 1, the at least one outgoing bait packet is sent as a broadcast from the bait address to the network.

5. The method of claim 1, wherein at least one outgoing bait packet is sent as a unicast from the bait address to the network.

6. The method of claim 1, wherein allocating at least one network address comprises allocating all ports of the network element as bait addresses.

7. A system for detecting are infected computing devices in a network, the system comprising:

a network element operatively coupled to a communications network, the network element having at least one network address allocated as a bait address, and comprising a malware detection component operative to send at least one outgoing bait packet from the bait address to the network according to a policy table stored in the network element, to receive an incoming packet from the network at the bait address, and to selectively identify a source of the incoming packet as infected with malware if the incoming packet is unexpected or from an unauthorized source;

wherein the bait address is a layer 2 MAC address shared by a first port of the network element configured for transmitting bait packets and a second port of the network element configured for receiving incoming packets from the network.

8. The system of claim 7, wherein the network element is a layer 2 switch or a layer 3 switch coupled to the communications network.

9. The system of claim 7, wherein the policy table comprises a bait packet types list and a bait packet schedule, and wherein the malware detection component is operative to send outgoing bait packets from the bait address to the network according to the bait packet types list and the bait packet schedule.

10. The system of claim 7, wherein the malware detection component is operative to send the outgoing bait packet as a broadcast from the bait address to the network.

11. The system of claim 7, wherein the malware detection component is operative to send the outgoing bait packet as a unicast from the bait address to the network.

12. The system of claim 7, wherein all ports of the network element are allocated as bait addresses.

13. The system of claim 7, wherein the at least one outgoing bait packet sent from the bait address to the network does not indicate any specific service, and instead merely announces the existence of the bait address.

14. The system of claim 13, wherein the at least one outgoing bait packet sent from the bait address to the network is a bootp broadcast.

15. The system of claim 7, wherein the malware detection component is operative to determine whether the incoming packet is unexpected based on the type of outgoing bait packet sent from the bait address to the network.

16. The method of claim 1, wherein the malware detection component is implemented on a subnet of the communications network.

17. The system of claim 7, wherein the malware detection component is implemented on a subnet of the communications network.

18. The method of claim 2, wherein the layer 2 switch or the layer 3 switch has one or more processors running one or more malware detection components.

19. The system of claim 8, wherein the layer 2 switch or the layer 3 switch has one or more processors running one or more malware detection components.

20. A method of detecting malware infected computing devices in a network, the method comprising:

allocating at least one network address in a network element coupled to a communications network as a bait address;

sending at least one outgoing bait packet from the bait address to the network;

receiving an incoming packet from the network at the bait address; and selectively identifying a source of the incoming packet as infected with malware if the incoming packet is of an unexpected type and from an unauthorized source;

wherein the bait address is a layer 2 MAC address shared by a first port of the network element configured for transmitting bait packets and a second port of the network element configured for receiving incoming packets from the network.

\* \* \* \* \*